(12) United States Patent
Dionne et al.

(10) Patent No.: US 10,858,115 B2
(45) Date of Patent: Dec. 8, 2020

(54) AIRCRAFT WITH WHEEL WELL BETWEEN HEAT EXCHANGERS OF ENGINE ASSEMBLY

(71) Applicant: PRATT & WHITNEY CANADA CORP., Longueuil (CA)

(72) Inventors: Luc Dionne, Candiac (CA); Bruno Villeneuve, Boucherville (CA); Jean Thomassin, Sainte-Julie (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 370 days.

(21) Appl. No.: 15/898,732

(22) Filed: Feb. 19, 2018

(65) Prior Publication Data

US 2019/0256217 A1 Aug. 22, 2019

(51) Int. Cl.

| | | |
|---|---|---|
| *B64D 35/02* | (2006.01) | |
| *B64C 1/06* | (2006.01) | |
| *B64C 25/34* | (2006.01) | |
| *B64D 27/08* | (2006.01) | |
| *B64D 33/08* | (2006.01) | |
| *F01P 3/18* | (2006.01) | |

(Continued)

(52) U.S. Cl.
CPC ............ *B64D 35/02* (2013.01); *B64C 1/068* (2013.01); *B64C 25/34* (2013.01); *B64D 27/08* (2013.01);

(Continued)

(58) Field of Classification Search
CPC ........ B64D 35/02; B64D 27/08; B64D 33/08; B64D 33/10; B64D 2027/026;

(Continued)

(56) References Cited

U.S. PATENT DOCUMENTS

| 1,427,872 A | 9/1922 | Verville |
|---|---|---|
| 2,087,832 A | 7/1937 | Maro |

(Continued)

FOREIGN PATENT DOCUMENTS

| DE | 853388 | 10/1952 |
|---|---|---|
| DE | 883084 C | 10/1952 |

(Continued)

OTHER PUBLICATIONS

European Search Report issued in corresponding EP application No. 19158149 dated Jun. 28, 2019.

*Primary Examiner* — Rodney A Bonnette
(74) *Attorney, Agent, or Firm* — Norton Rose Fulbright Canada LLP

(57) ABSTRACT

An assembly for an aircraft having a propeller, including a wheel well for a retracted landing gear, first and second cooling ducts; and an engine assembly having an engine shaft configured for driving engagement with the propeller, the engine assembly including a coolant circulation system for circulation of a liquid coolant, a lubricant circulation system for circulation of a lubricant, a first heat exchanger in fluid communication with at least the coolant circulation system, and a second heat exchanger in fluid communication with at least the lubricant circulation system. Each heat exchanger is positioned and configured for receiving a cooling airflow from the respective cooling duct. The wheel well is located between the heat exchangers. A method of cooling a lubricant and a liquid coolant of an engine assembly is also discussed.

23 Claims, 9 Drawing Sheets

(51) Int. Cl.
*F01P 7/02* (2006.01)
*F01P 11/10* (2006.01)
*F02B 37/00* (2006.01)
*F02B 41/10* (2006.01)
*F02B 53/00* (2006.01)
*B64D 33/10* (2006.01)
*B64D 33/02* (2006.01)
*B64D 27/02* (2006.01)

(52) U.S. Cl.
CPC ............ *B64D 33/08* (2013.01); *B64D 33/10* (2013.01); *F01P 3/18* (2013.01); *F01P 7/023* (2013.01); *F01P 11/10* (2013.01); *F02B 37/004* (2013.01); *F02B 41/10* (2013.01); *F02B 53/00* (2013.01); *B64D 2027/026* (2013.01); *B64D 2033/024* (2013.01); *F02B 2053/005* (2013.01)

(58) Field of Classification Search
CPC ... B64D 2033/024; B64C 1/068; B64C 25/34; F01P 3/18; F01P 7/023; F01P 11/10; F02B 37/004; F02B 41/10; F02B 53/00; F02B 2053/005
See application file for complete search history.

(56) References Cited

U.S. PATENT DOCUMENTS

| | | | |
|---|---|---|---|
| 2,214,723 A | 9/1940 | Holland, Jr. | |
| 2,219,980 A | 10/1940 | De Seversky | |
| 2,340,396 A | 2/1944 | McDonnell, Jr. | |
| 2,372,250 A | 3/1945 | Burnelli | |
| 2,388,247 A | 11/1945 | Murray | |
| 2,410,856 A | 11/1946 | Koppen | |
| 2,434,085 A | 1/1948 | Suggs | |
| 2,477,637 A | 8/1949 | Ernest | |
| 2,504,137 A | 4/1950 | Lewis | |
| 2,540,991 A | 2/1951 | Price | |
| 2,605,851 A | 8/1952 | Gleason | |
| 3,028,124 A | 4/1962 | Sammons | |
| 4,456,458 A | 6/1984 | Gilbertson | |
| 4,782,658 A * | 11/1988 | Perry | F02C 7/047 60/226.1 |
| 5,435,502 A | 7/1995 | Wernicke | |
| 7,753,036 B2 | 7/2010 | Lents et al. | |
| 7,775,044 B2 | 8/2010 | Julien et al. | |
| 2015/0275749 A1 | 10/2015 | Thomassin et al. | |
| 2015/0275756 A1 | 10/2015 | Bolduc et al. | |
| 2016/0245456 A1 | 8/2016 | Lamarre | |
| 2017/0021937 A1 | 1/2017 | Bustillo | |
| 2017/0037756 A1* | 2/2017 | Julien | F02C 6/206 |
| 2019/0256214 A1* | 8/2019 | Dionne | B64D 35/02 |
| 2019/0256216 A1* | 8/2019 | Dionne | F02B 41/10 |

FOREIGN PATENT DOCUMENTS

| | | |
|---|---|---|
| EP | 3059387 A1 | 8/2016 |
| EP | 3059420 A1 | 8/2016 |
| FR | 832082 A | 9/1938 |
| GB | 493673 | 10/1938 |
| GB | 571741 | 9/1945 |

* cited by examiner

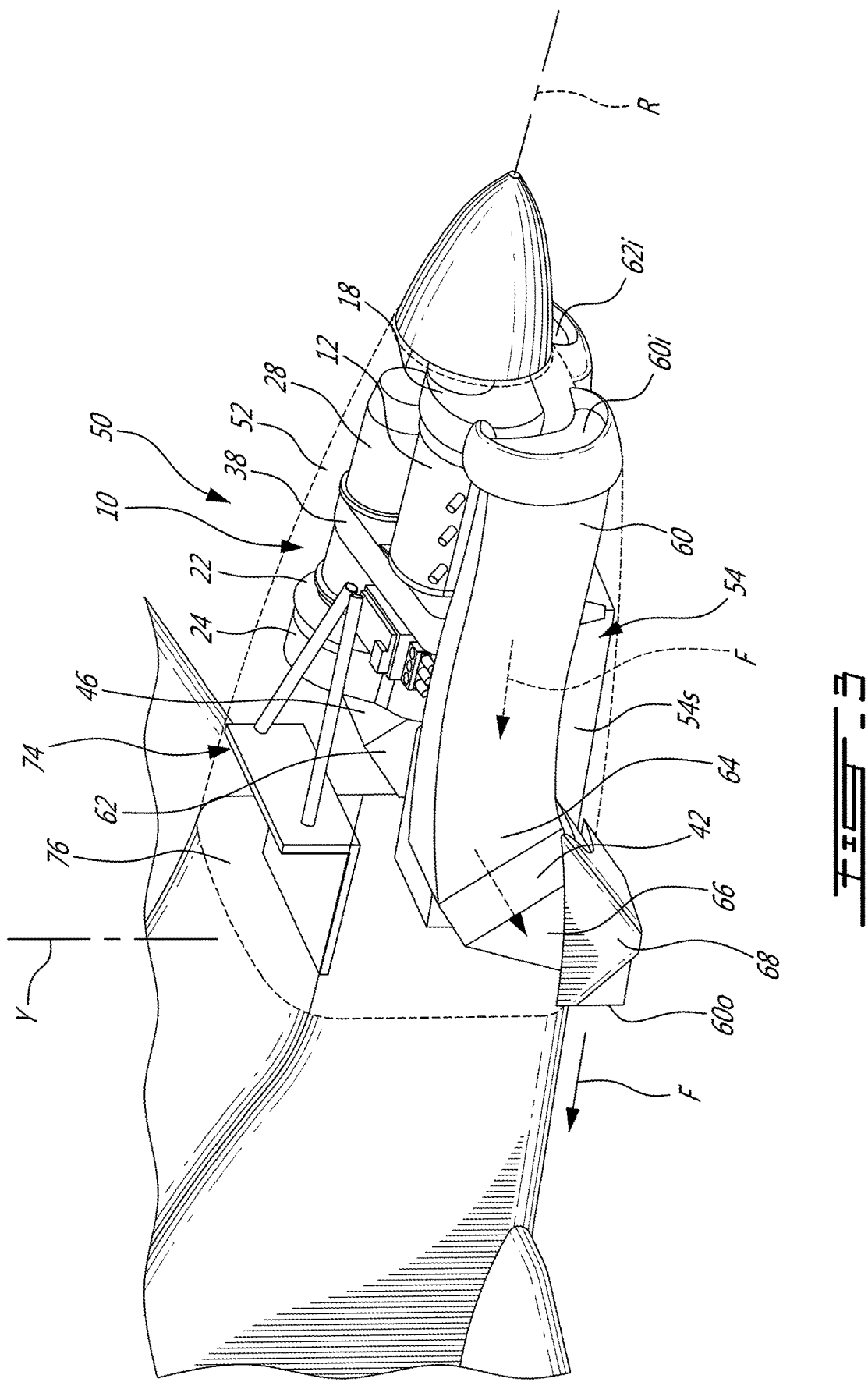

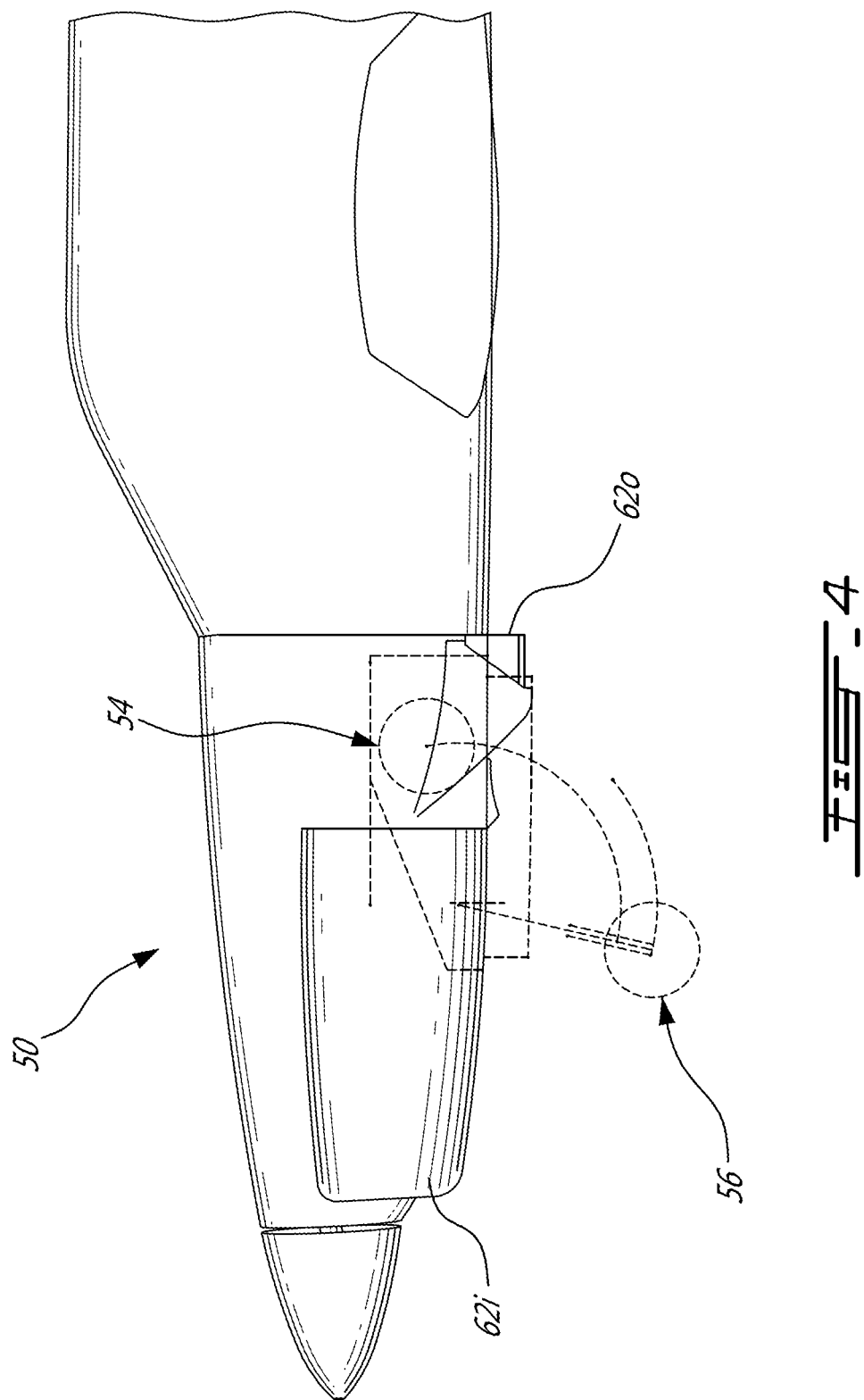

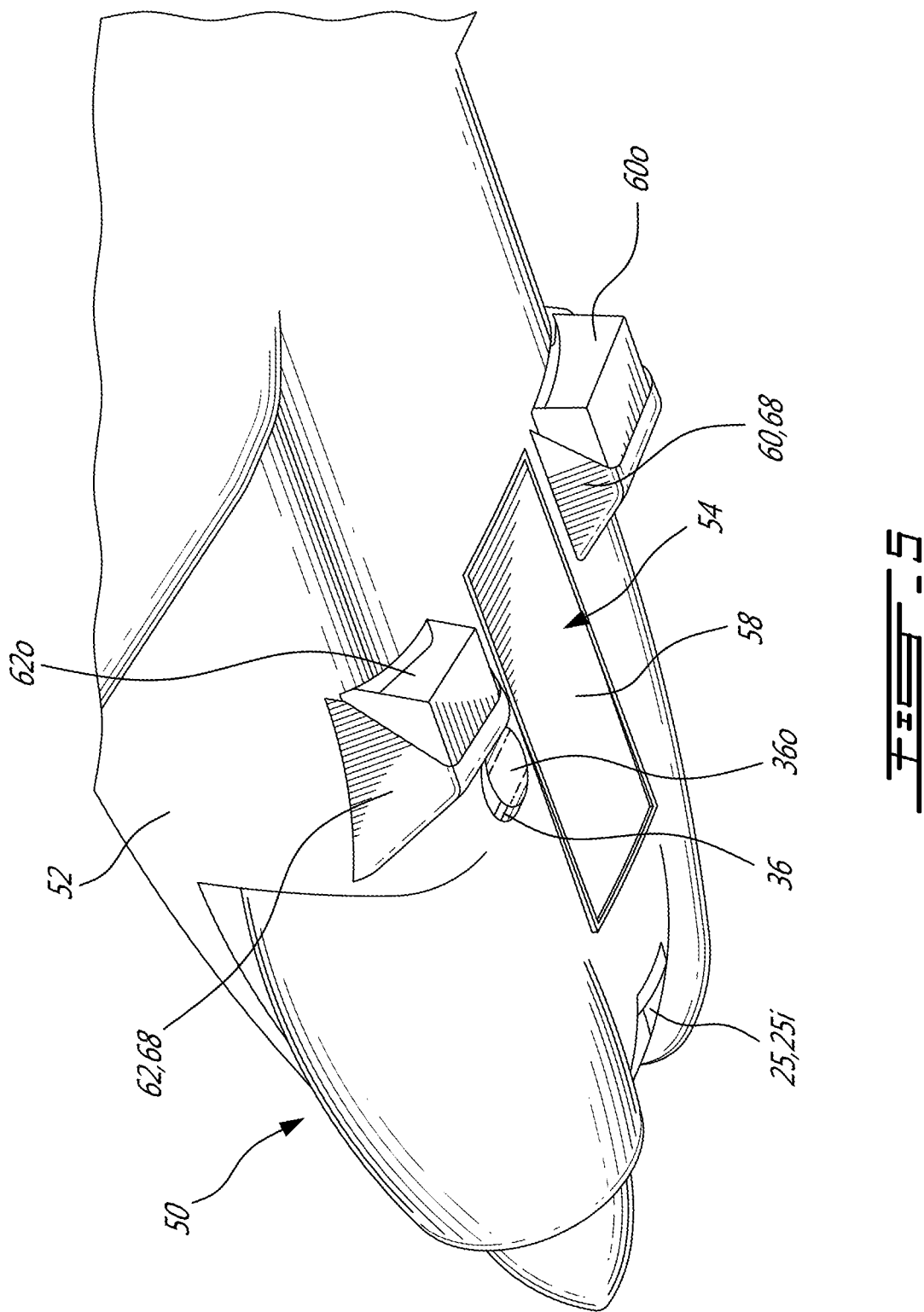

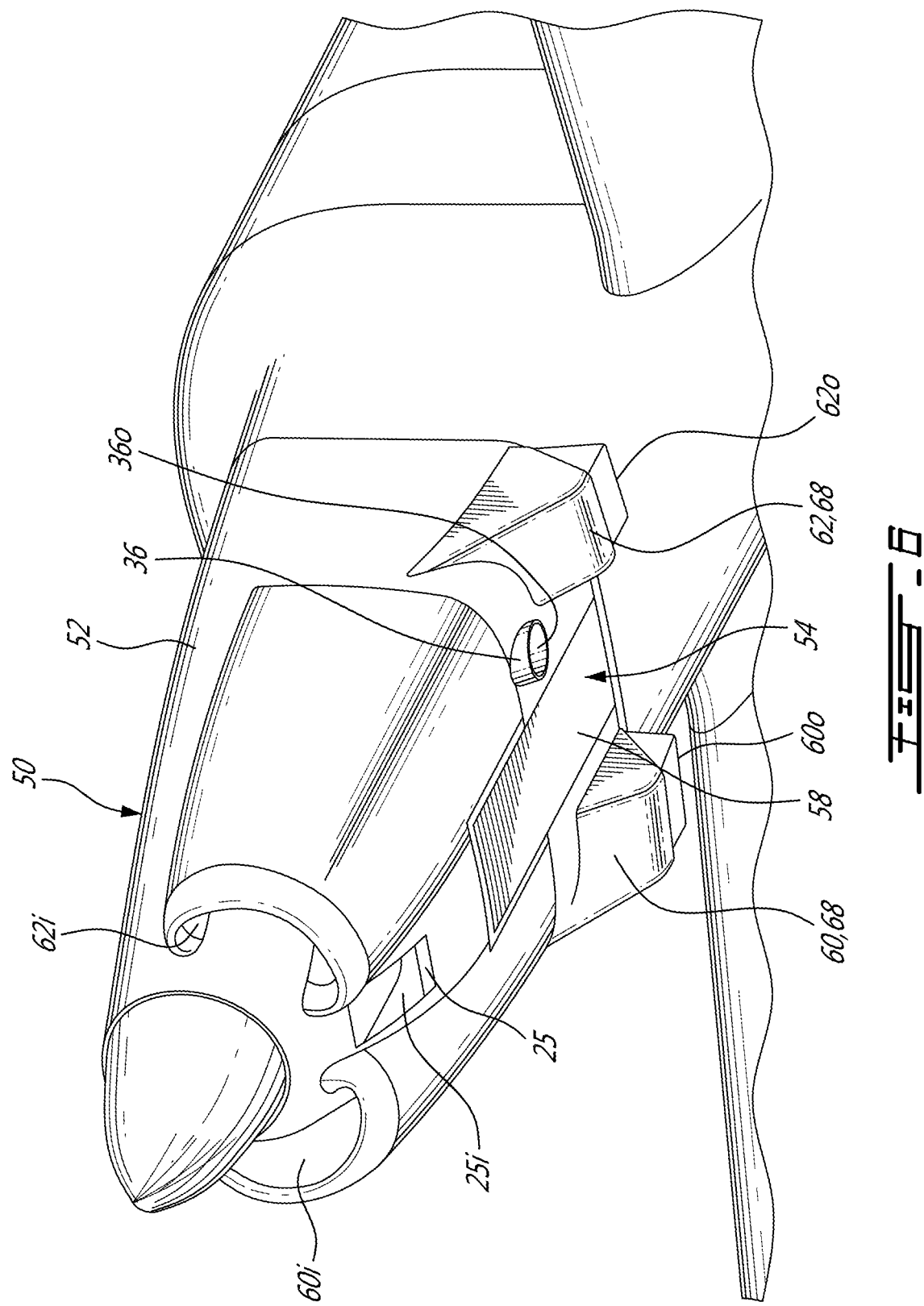

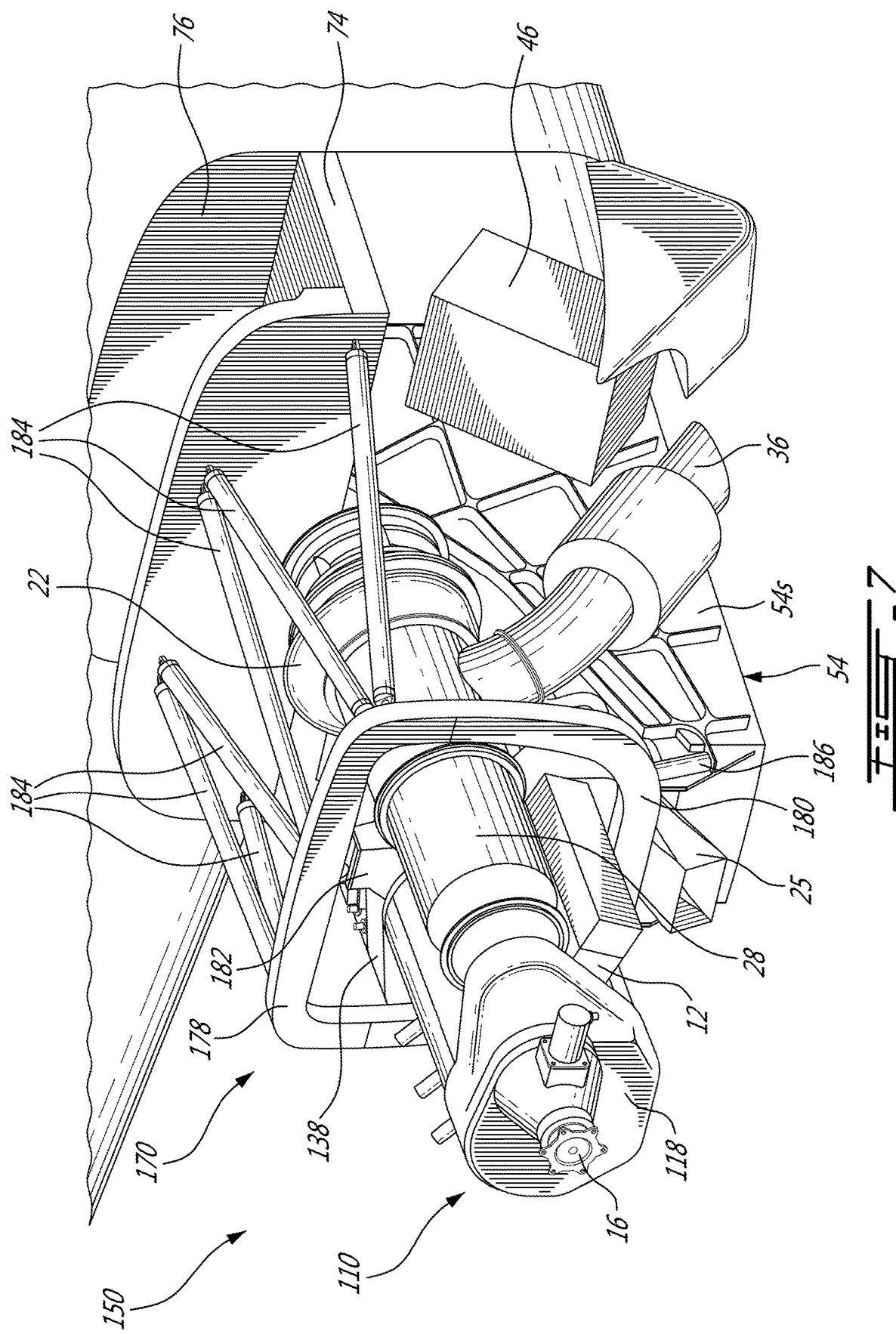

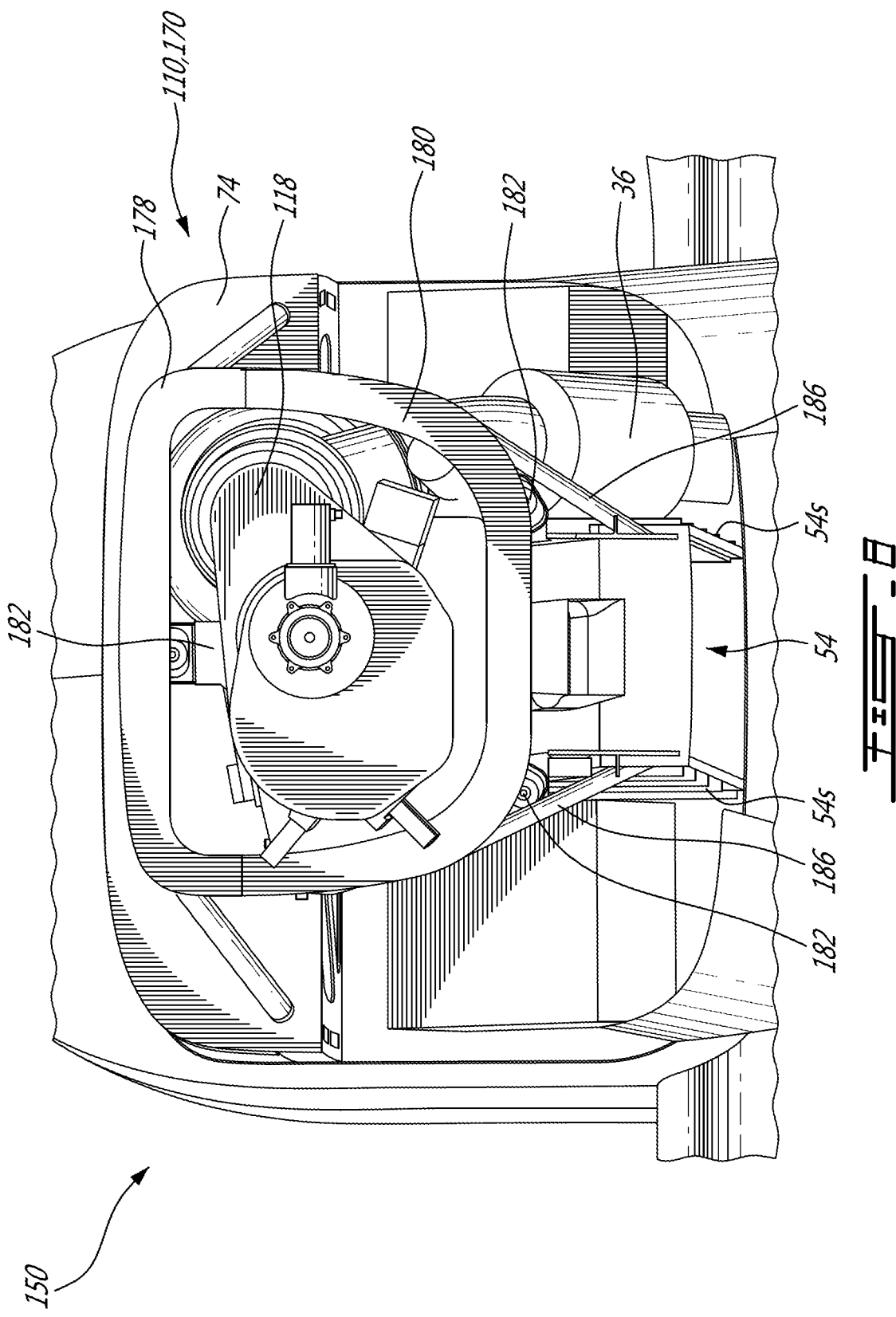

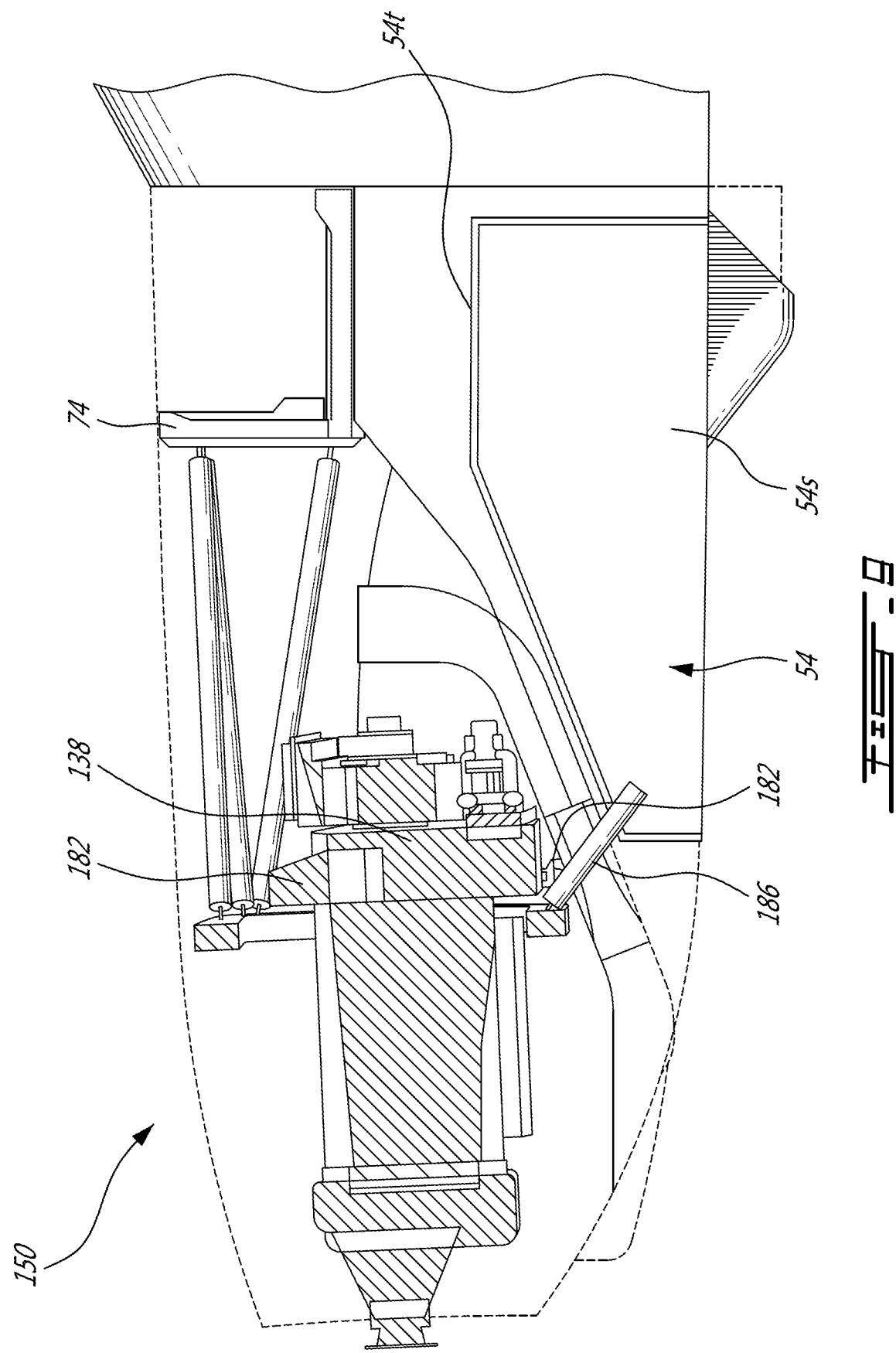

AIRCRAFT WITH WHEEL WELL BETWEEN HEAT EXCHANGERS OF ENGINE ASSEMBLY

TECHNICAL FIELD

The application relates generally to aircraft engines and, more particularly, to engine assemblies for driving propellers.

BACKGROUND OF THE ART

Engine assemblies mounted in the nose or wing of aircraft are typically supported on the bulkhead at the structural interface between the engine compartment and the airframe structure. When a retractable landing gear is provided, it is known to install the engine in front of the landing gear compartment. It is also known to locate the engine oil cooler in front of the engine, in a duct directing cooling air through the oil cooler.

SUMMARY

In one aspect, there is provided an assembly for an aircraft having a propeller, the assembly comprising: a wheel well configured for receiving a retracted landing gear; first and second cooling ducts; and an engine assembly having an engine shaft configured for driving engagement with the propeller, the engine assembly including a coolant circulation system for circulation of a liquid coolant, a lubricant circulation system for circulation of a lubricant, a first heat exchanger in fluid communication with at least the coolant circulation system, and a second heat exchanger in fluid communication with at least the lubricant circulation system, the first heat exchanger positioned and configured for receiving a first cooling airflow from the first cooling duct, and the second heat exchanger positioned and configured for receiving a second cooling airflow from the second cooling duct, the wheel well located between the first and second heat exchangers.

In another embodiment, the assembly for an aircraft having a propeller, the assembly comprising: a wheel well configured for receiving a retracted landing gear; first and second cooling ducts in fluid communication with an environment of the aircraft; and an engine assembly including: a rotary internal combustion engine in driving engagement with an engine shaft, the engine shaft configured for driving engagement with the propeller, the rotary internal combustion engine configured for circulation of a liquid coolant therethrough, a turbine having an inlet in fluid communication with an exhaust of the rotary internal combustion engine, the turbine including a turbine shaft configured to compound power with the engine shaft, a first heat exchanger in fluid communication with the rotary internal combustion engine for circulation of the liquid coolant therethrough, the first heat exchanger positioned and configured for receiving a first cooling airflow from the first cooling duct for cooling the liquid coolant, and a second heat exchanger in fluid communication with a lubricant circulation system of the engine assembly, the second heat exchanger positioned and configured for receiving a second cooling airflow from the second cooling duct for cooling the lubricant, the wheel well located between the first and second heat exchangers.

In a further aspect, there is provided a method of cooling a lubricant and a liquid coolant of an engine assembly in an aircraft having a propeller driven by the engine assembly and a retractable landing gear, the method comprising: circulating a first airflow through a first cooling duct and a second airflow through a second cooling duct, including circulating the first and second airflows along opposed sides of a wheel well configured for receiving the retractable landing gear; with the first airflow, cooling at least the liquid coolant; and with the second airflow, cooling at least the lubricant.

DESCRIPTION OF THE DRAWINGS

Reference is now made to the accompanying figures in which:

FIG. 3 is a schematic tridimensional view of the assembly of FIG. 2;

FIG. 4 is a schematic side view of a front nacelle including an assembly such as shown in FIGS. 2-3

FIGS. 5-6 are schematic tridimensional bottom views of the nacelle of FIG. 4;

FIG. 7 is a schematic tridimensional view of an engine assembly and mount assembly in accordance with another particular embodiment;

FIG. 8 is a schematic front view of the assemblies of FIG. 7; and

FIG. 9 is a schematic cross-sectional view of the assemblies of FIG. 7.

DETAILED DESCRIPTION

Figure 1:
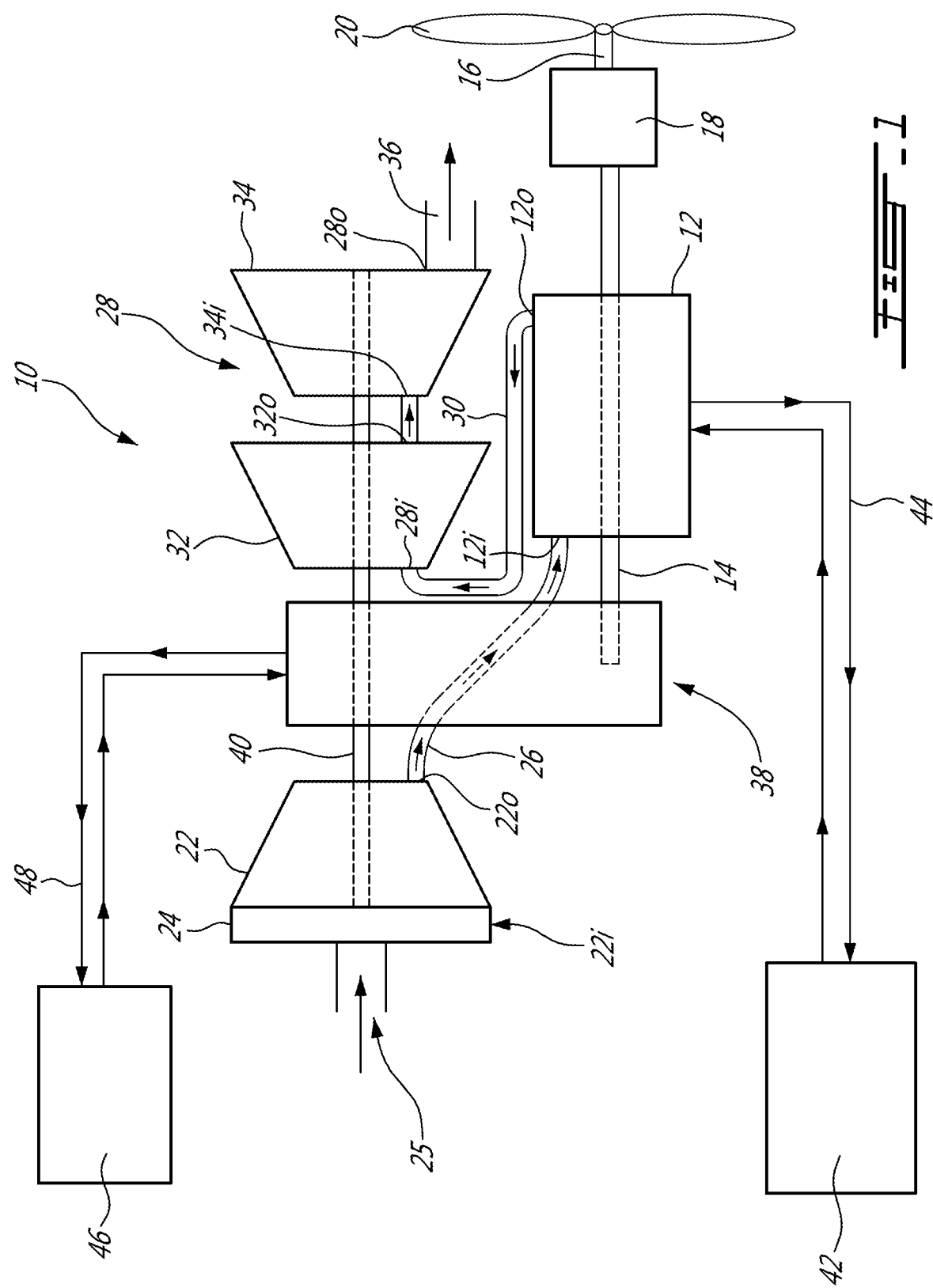
FIG. 1 is a schematic view of an engine assembly in accordance with a particular embodiment.

Referring to FIG. 1, an engine assembly 10 is generally shown and includes an internal combustion engine 12. In a particular embodiment, the engine assembly 10 is a compound cycle engine system or compound cycle engine such as described in Lents et al.'s U.S. Pat. No. 7,753,036 issued Jul. 13, 2010 or as described in Julien et al.'s U.S. Pat. No. 7,775,044 issued Aug. 17, 2010, or as described in Thomassin et al.'s U.S. patent publication No. 2015/0275749 published Oct. 1, 2015, or as described in Bolduc et al.'s U.S. patent publication No. 2015/0275756 published Oct. 1, 2015, the entire contents of all of which are incorporated by reference herein. The engine assembly may be used as a prime mover engine, such as on an aircraft or other vehicle, or in any other suitable application.

In the embodiment shown, the internal combustion engine 12 is an intermittent internal combustion engine including one or more rotor assembly(ies), for example three (3) rotor assemblies, each configured for example as a Wankel engine; it is understood that the internal combustion engine 12 may have any other suitable configuration, for example including one or more reciprocating pistons. The internal combustion engine 12 drives an engine shaft 14 that is drivingly engaged to a propeller shaft 16 via a reduction gearbox 18 so as to drive an aircraft propeller 20. It is however understood that the engine assembly 10 may alternately or additionally be configured to drive any other appropriate type of load, including, but not limited to, one or more generator(s), accessory(ies), rotor mast(s), compressor(s), or any other appropriate type of load or combination thereof.

The engine assembly 10 also includes a compressor 22 for compressing the air before it is fed to an intake 12*i* of the internal combustion engine 12. The engine intake 12*i* may for example correspond to or communicate with the inlet port of each rotor assembly or reciprocating piston of the internal combustion engine 12. An inlet plenum or scroll 24 is fluidly connected to a source of air, for example an environment of the aircraft, via a suitable inlet conduit 25, and is in fluid communication with an inlet 22i of the compressor 22. An outlet 22o of the compressor 22 is in fluid communication with the air intake 12i of the internal combustion engine 12, for example via a suitable conduit 26.

The engine assembly 10 further includes a turbine section 28 receiving the exhaust gases from the internal combustion engine 12, for example an exhaust flow of high pressure hot gas exiting at high peak velocity in the form of exhaust pulses. In the illustrated embodiment, an exhaust 12o of the internal combustion engine 12 is in fluid communication with an inlet 28i of the turbine section 28 via a suitable conduit 30. The exhaust 12o of the internal combustion engine 12 may for example correspond to or communicate with the exhaust port of each rotor assembly or reciprocating piston of the internal combustion engine 12. In the embodiment shown, the turbine section 28 comprises two turbine stages 32, 34 in serial fluid communication with each other, so that the inlet of the first turbine stage 32 defines the inlet 28i of the turbine section 28 communicating with the exhaust 12o of the internal combustion engine 12, and an outlet 32o of the first turbine stage 32 communicates with an inlet 34i of the second turbine stage 34. Other configurations are contemplated. The flow of exhaust gases exits an outlet 28o of the turbine section 28 (e.g. an outlet of the second turbine stage 34), for example via an exhaust conduit 36 connected to the outlet 28o of the turbine section 28 and in fluid communication with the environment of the aircraft (i.e. with atmosphere).

In the embodiment shown, the engine shaft 14, the compressor 22 and the turbine section 28 are in driving engagement with each other via a compounding gearbox 38. The gearbox 38 is configured to allow the turbine section 28 to compound power with the engine shaft 14 and to allow the turbine section 28 and/or the internal combustion engine 12 to drive the compressor 22. The gearbox 38 may also be drivingly engaged to engine accessories (not shown). In the embodiment shown, the turbine section 28 includes a turbine shaft 40, to which the rotors of the turbine section 28 are connected. The turbine shaft 40 extends through the gearbox 38 and also receives the rotor(s) of the compressor 22. The turbine shaft 40 is drivingly engaged to the engine shaft 14 via the gearbox 38. Accordingly, the power from the turbine shaft 40 and engine shaft 14 is compounded by the gearbox 38 to drive the propeller 20 and the compressor 22. It is understood that any other suitable manner of compounding power from the turbine shaft 40 with power from the engine shaft 14 may alternately be used, including, but not limited to, a driving engagement between the turbine shaft 40 and the engine shaft 14 via the reduction gearbox 18 (see e.g. FIGS. 7-9 discussed further below), electrical compounding via power transfer between generators connected to the independently rotatable shafts, etc. In the embodiment shown, the turbine shaft 40 and engine shaft 14 are parallel to and offset from each other. Other configurations are also possible.

The engine assembly 10 also includes a first heat exchanger 42 configured as a coolant cooler. The heat exchanger 42 has one or more coolant conduits fluidly connected to a coolant circulation system 44, which is fluidly connected to the internal combustion engine 12 to circulate a cooling fluid therein. Accordingly, the heat exchanger 42 is configured to receive and cool the cooling fluid circulated out of the internal combustion engine 12 before the cooling fluid is circulated back to the internal combustion engine 12. The heat exchanger 42 further includes one or more air conduits configured for circulation of cooling air therethrough, with the air conduit(s) and coolant conduit(s) being in heat exchange relationship with each other so that circulation of cooling air through the cooling conduit(s) provides cooling of the cooling fluid circulating through the coolant conduit(s). The cooling fluid may be a suitable liquid coolant, for example a suitable water-based coolant. Although not shown, it is understood that the coolant circulation system 44 includes one or more pump(s) or any other suitable mechanism for driving the circulation of the cooling fluid through the coolant circulation system 44, including between the internal combustion engine 12 and the heat exchanger 42.

The engine assembly 10 further includes a second heat exchanger 46 configured as a lubricant cooler. The second heat exchanger 46 has one or more lubricant conduits fluidly connected to a lubricant circulation system 48 of the engine assembly 10. The lubricant circulation system 48 is fluidly connected to one or more components of the engine assembly 10 to circulate a lubricant thereto; in the embodiment shown, the lubricant circulation system 48 is connected to the gearbox 38, and the gearbox 38 includes a casing which may also contain bearings supporting the shafts 14, 40 and may therefore act as or include one or more bearing housing(s) also receiving the lubricant. The second heat exchanger 46 is configured to receive and cool the lubricant before the lubricant is circulated back to the component(s) of the engine assembly 10. The second heat exchanger 46 further includes one or more air conduits configured for circulation of cooling air therethrough, with the air conduit(s) and lubricant conduit(s) being in heat exchange relationship with each other so that circulation of cooling air through the cooling conduit(s) provides cooling of the lubricant circulating through the lubricant conduit(s). The lubricant may be a suitable liquid lubricant, for example a suitable type of oil. Although not shown, it is understood that the lubricant circulation system 48 includes one or more pump(s) or any other suitable mechanism for driving the circulation of the lubrication through the lubricant circulation system 48, including between the component(s) of the engine assembly 10 and the second heat exchanger 46.

Although each heat exchanger 42, 46 is shown as being connected to the respective circulation system 44, 48 without being connected to the other, it is understood that other configurations are also possible. For example, one or both of the heat exchanger 42, 46 may be connected to both the coolant and lubricant circulation systems 44, 48, including one or more conduits for receiving the coolant and one or more conduits for receiving the lubricant, each in heat exchange relationship with the one or more conduits through which the cooling airflow circulates; the coolant conduit(s) and lubricant conduit(s) may also be in heat exchange relationship with each other.

Figure 2:
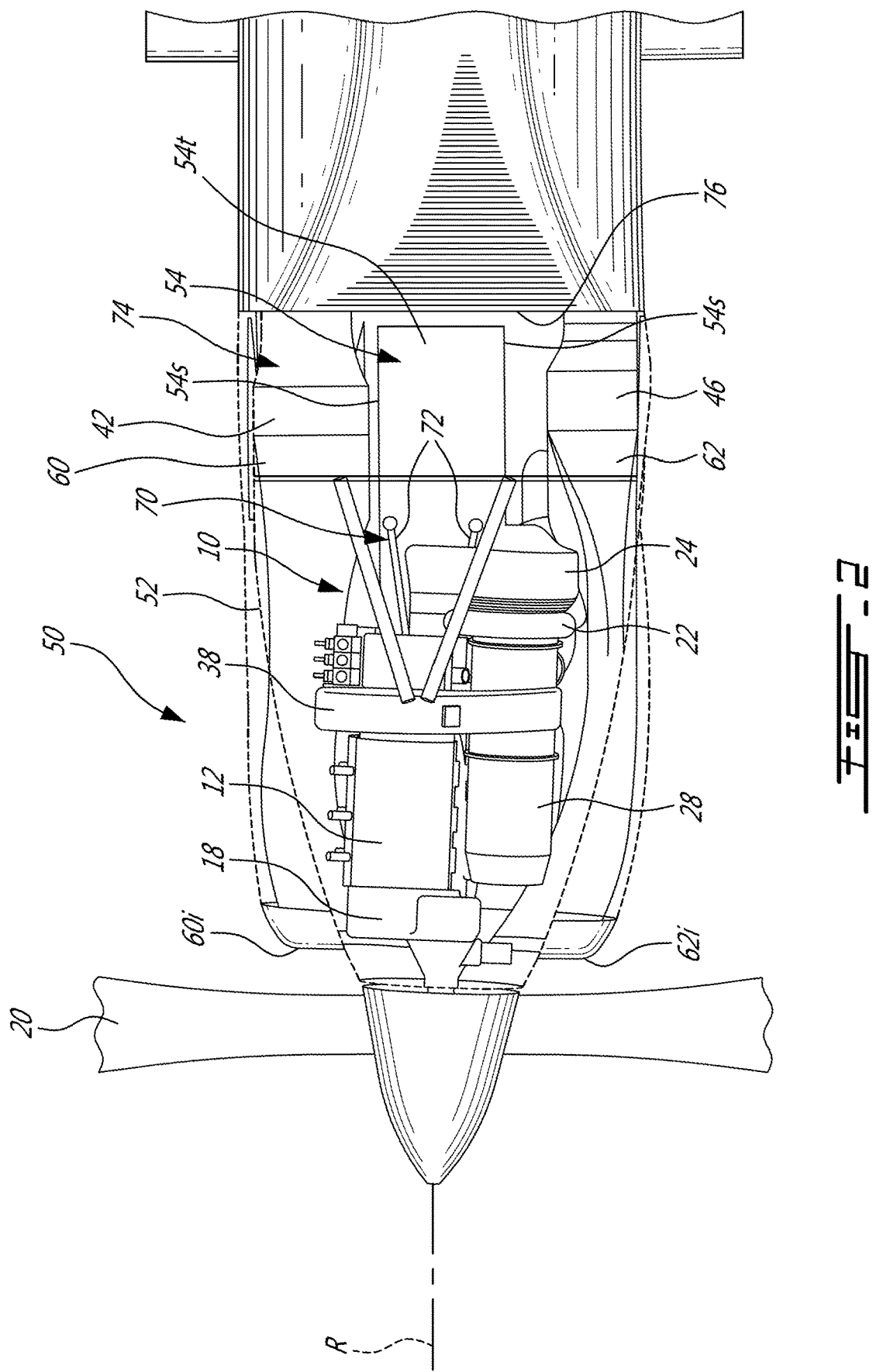
FIG. 2 is a schematic top view of a nose assembly in accordance with a particular embodiment, including an engine assembly such as shown in FIG. 1.

Referring to FIGS. 2-6, an assembly 50 configured as a nose assembly for a front end of an aircraft and including the engine assembly 10 is generally shown. Referring particularly to FIGS. 2-3, the nose assembly 50 is received in a front or nose nacelle 52 of the aircraft: the reduction gearbox 18 is connected to the front of the internal combustion engine 12 (as shown, including three rotor assemblies each configured as a Wankel engine), the compounding gearbox 38 is connected to the rear of the internal combustion engine 12, the turbine section 28 is connected to the compounding gearbox 38 and extends side-by-side with the internal combustion engine 12, and the compressor 22 is located aft of the turbine section 28. Other configurations are also possible.

The assembly 50 includes a wheel well 54 located under the engine assembly 10, and configured for receiving a retractable landing gear 56 (see FIG. 4) when in a retracted configuration. The wheel well 54 has a plurality of interconnected walls which form a box for containing the landing gear 56 when retracted: side walls 54s, a front wall and a rear wall together defining a perimeter which in the embodiment shown is rectangular, and a top wall 54t (FIG. 2) connected to the side, front and rear walls so as to close the top of the box. The wheel well 54 has a selectively closable bottom opening opposed to the top wall 54t, for deploying the retractable landing gear 56 therethrough. In the embodiment shown, a pivotable door 58 (see FIGS. 5-6) selectively closes the bottom opening of the wheel well 54, with the door 58 being pivotally connected to the aircraft (e.g. to one of the side, front and rear walls of the wheel well 54). Other configurations are possible.

Still referring to FIGS. 2-3, the assembly 50 further includes cooling ducts feeding cooling air to the heat exchangers 42, 46: the first, e.g. coolant, heat exchanger 42 is positioned and configured for receiving a cooling airflow from the first cooling duct 60, and the second, e.g. lubricant, heat exchanger 46 is positioned and configured for receiving a cooling airflow from the second cooling duct 62. In the embodiment shown, the first heat exchanger 42 is received in the first cooling duct 60 and the second heat exchanger 46 is received in the second cooling duct 62. Each heat exchanger 42, 46 extends across the respective cooling duct 60, 62 so that all of the airflow circulating through each cooling duct 60, 62 circulates through the heat exchanger 42, 46 received therein. The cooling ducts 60, 62 extend on respective sides of the wheel well 54, so that the wheel well 54 is located between the heat exchangers 42, 46, as can be best seen in FIG. 2. In the embodiment shown, the internal combustion engine 12, compressor 22 and turbine section 28 are all located between the two cooling ducts 60, 62. The heat exchangers 42, 46 are located closer to the outlet of the cooling ducts 60, 62 than to their inlets. In the embodiment shown, the heat exchangers 42, 46 define a rearmost portion of the engine assembly 10: the heat exchangers 42, 46 are located aft of the internal combustion engine 12, compressor 22, and turbine section 28.

The cooling ducts 60, 62 each have a front inlet 60i, 62i in direct fluid communication with the environment of the aircraft. The cooling duct inlets 60i, 62i are located adjacent to and downstream of the propeller 20 (see FIG. 2) so as to benefit from the pressure increase in the air created by the propeller 20. The reduction gearbox 18 is thus located adjacent to and between the cooling duct inlets 60i, 62i. As can be best seen in to FIG. 5, the cooling ducts 60, 62 also each have a rear outlet 60o, 62o in direct fluid communication with the environment; the cooling duct outlets 60o, 62o are laterally spaced from each other, and the wheel well 54 is located between the two outlets 60o, 62o.

Referring back to FIG. 3, each cooling duct 60, 62 includes a diffusing portion 64 and a nozzle portion 66. The respective heat exchanger 42, 46 is located downstream of the diffusing portion 64 and upstream of the nozzle portion 66, e.g. the diffusing portion 64 extends immediately upstream from the heat exchanger 42, 46, and the nozzle portion 66 extends immediately downstream from the heat exchanger 42, 46. The diffusing portion 64 has a progressively increasing cross-sectional area along the direction of flow F within the cooling duct 60, 62, and the nozzle portion 66 has a progressively reducing cross-sectional area along the direction of flow F. Each cooling duct 60, 62 thus has a cross-sectional area which increases before the heat exchanger 42, 46 so as to diffuse and slow down the cooling air flow before it enters the heat exchanger 42, 46 (e.g., from Mach 0.35 at the cooling duct inlet 60i, 62i to Mach 0.12 adjacent the heat exchanger 42, 46), and a cross-sectional area which reduces after the heat exchanger 42, 46 so as to accelerate the cooling flow, preferably back to or close to its initial speed before it was slowed down in the diffusing portion 64 (e.g., Mach 0.12).

As can also be best seen in FIG. 3, each cooling duct 60, 62 extends longitudinally from the cooling duct inlet 60i, 62i to the diffusing portion 64, so that the flow in the cooling duct 60, 62 follows the direction of travel of the aircraft. The diffusing portion 64 then turns the flow downwardly, so that the cooling airflow through the heat exchanger 42, 46 and through the nozzle portion 66 downstream thereof is performed at a non-zero angle with respect to the longitudinal direction (roll axis R) and with respect to the normal direction (yaw axis Y).

As can be best seen in FIGS. 5-6, the downstream end 68 of each of the cooling ducts 60, 62, which extends from the nozzle portion 66 and defines the cooling duct outlet 60o, 62o, protrudes downwardly from the nacelle 52 receiving the engine assembly 10. The downstream ends 68 of the cooling ducts 60, 62 are laterally spaced from each other with the wheel well 54 located between them. The downstream end 68 of each cooling duct 60, 62 turns the cooling flow F back to a longitudinal flow, i.e. along a direction parallel to or substantially parallel to the longitudinal direction (see FIG. 3). The downstream ends 68 are thus oriented so that the flow F out of the cooling duct outlets 60o 62o is directed rearwardly and longitudinally, underneath the nacelle 52. In a particular embodiment, the nozzle portions 66, downstream ends 68 and cooling duct outlets 60o, 62o enable ram recovery of the cooling airstream so as to reduce or minimize the drag induced by the extraction of the cooling airflows.

As can be best seen in FIGS. 5-6, the inlet conduit 25 for the compressor 22 has an inlet 25i located between the inlets 60i, 62i of the cooling ducts 60, 62. The inlet conduit 25 defines the fluid communication between the environment of the aircraft and the inlet 22i of the compressor 22 independently of and separately from the cooling ducts 60, 62. The exhaust conduit 36 for the turbine section 28 has an outlet 36o located forward of the outlet 62o of one of the cooling ducts 62. The exhaust conduit 36 defines the fluid communication between the outlet 28o of the turbine section 28 and the environment of the aircraft independently of and separately from the cooling ducts 60, 62.

As can be best seen in FIG. 2, in the embodiment shown the cooling ducts 60, 62 have different cross-sectional areas from each other; portions that are aligned along the longitudinal axis R of the aircraft have different dimensions from each other, so that along the length of the cooling ducts 60, 62, one duct has a cross-sectional area smaller than the other, and accordingly contains a smaller flow of cooling air. This configuration is determined by the cooling airflow requirements of the heat exchangers 42, 46; the heat exchanger 46 received in the smallest cooling duct 62 (e.g. lubricant heat exchanger) has a lower cooling airflow requirement than the other heat exchanger 42 (e.g. liquid coolant heat exchanger).

In another embodiment, the inlet conduit 25 for the compressor 22 and/or the exhaust conduit 36 for the turbine section 28 may be combined with or communicate with the cooling duct 62 containing the heat exchanger 46 requiring the lowest cooling air flow; this may enable to have two cooling ducts of similar or equal cross-sectional areas with respect to each other, for example cooling ducts symmetrical about the longitudinal axis R of the aircraft, despite one of the heat exchanger 46 requiring a smaller cooling airflow than the other heat exchanger 42.

In another embodiment, cooling for both the liquid coolant and the lubricant is provided in one or both of the cooling ducts 60, 62 so as to balance the cooling airflow requirements, and the cooling ducts have similar or equal cross-sectional areas with respect to each other, and are for example symmetrical about the longitudinal axis R of the aircraft.

Still referring to FIG. 2, in the embodiment shown the engine assembly 10 is located over the wheel well 54, and mounted thereto. The walls of the wheel well 54 define a structural assembly, sized so as to be able to support the loads generated by the engine assembly 10. A mount assembly 70 thus interconnects the engine assembly 10 to one or more of the walls of the wheel well 54, for example to the top wall 54*t* (as shown) or the side walls 54*s*.

In the embodiment shown, the mount assembly 70 is connected to the engine assembly 10 by being connected to the casing of the compounding gearbox 38, for example to a bottom wall of the casing. The mount assembly 70 includes two struts 72 connected to the gearbox 38 in an adjacent manner, for example by being connected to a same mount attached to the gearbox 38. The struts 72 extend at an angle with respect to each other. The struts 72 are connected to the top wall 54*t* of the wheel well 54 at spaced apart locations (as shown), or are each connected to one of the side walls 54*s* of the wheel well 54. Other configurations are also possible. Although not shown, more than one mount (for example, two engine mounts) may be provided on the gearbox 38.

In the embodiment shown, the mount assembly 70 also includes two struts interconnecting the engine assembly 10 (e.g. a top wall of the casing of the compounding gearbox 38) to the aircraft structure, for example to a support 74 engaged to an aft bulkhead/firewall 76 of the nacelle 52.

Referring to FIGS. 7-9, a nose assembly 150 for a front end of an aircraft and including an engine assembly 110 and a mount assembly 170 in accordance with another embodiment is shown, where elements similar to that of the previous embodiments are identified by the same reference numerals and will not be further described herein. Some elements, such as the cooling ducts, are omitted for improved clarity.

In this embodiment, the gearbox 138 at the rear of the internal combustion engine 12 is an accessory gearbox, and is engaged to the engine shaft without being engaged to the turbine shaft; it is also engaged to one or more accessories to allow the engine shaft to drive the accessory(ies) via the gearbox 138. The reduction gearbox 118 at the front of the internal combustion engine also acts as a compounding gearbox, and drivingly engages the engine shaft and the turbine shaft with each other, as well as with the propeller shaft 16.

In this embodiment, the mount assembly 110 includes an upper yoke 178 and a lower yoke 180 which cooperate to surround the engine, and which are both connected to the aircraft structure, for example the nacelle skin. In the embodiment shown, the upper yoke 178 is fixed and the lower yoke 180 is removable for installation and removal of the engine assembly 110. The upper yoke 178 and lower yoke 180 are each connected to the accessory gearbox 138 via one or more engine mounts 182; the engine mounts 182 extend radially from the casing of the accessory gearbox 138, and each include an isolator having a central opening configured for receiving an axially extending bolt interconnecting the isolator to the corresponding yoke 178, 180. In the embodiment shown, the upper yoke 178 is connected to the casing of the gearbox 138 by a single mount 182 while the lower yoke 180 is connected to the casing of the gearbox 138 via two mounts 182. Other configurations are possible, including, but not limited to, a configuration where two mounts 182 per yoke 178, 180 are provided.

As can be best seen in FIG. 7, the upper yoke 178 is connected to a support 74 forming part of or connected to the aircraft structure via a plurality of upper struts 184. In the embodiment shown, six (6) upper struts 184 are provided forming a "zig-zag" pattern between the upper yoke 178 and the support 74: the upper struts 184 are connected to the upper yoke 178 in pairs of struts extending at an angle from each other, and the four central ones of the upper struts 184 are connected to the support 74 in different pairs of struts extending at an angle from each other. Other configurations are also possible.

In the embodiment shown and as can be best seen in FIG. 9, the support 74 extends upwardly spaced apart from the top wall 54*t* of the wheel well 54. However, the side walls 54*s* of the wheel well 54 extend upwardly beyond the top wall 54*t* so that the support 74 rests on the top edges of the side walls 54*s*. The loads of the support 74 are accordingly shared between the aircraft structure and the structure (walls) of the wheel well 54.

As can be best seen in FIG. 8, the lower yoke 180 is connected to the walls of the wheel well 54 via a plurality of lower struts 186. In the embodiment shown, two (2) lower struts 186 are provided, each extending between the lower yoke 178 and a respective one of the side walls 54*s*. Other configurations, including, but not limited to, a greater number of struts interconnecting the lower yoke 180 and the walls of the wheel well 54, are also possible.

It is understood that the engine assembly 10 of FIGS. 1-6 may be used with the mount assembly 170 of FIGS. 7-9 and that the engine assembly 110 of FIGS. 7-9 may be used with the mount assembly 70 of FIGS. 2-3.

Although the assemblies 50, 150 have been shown as including the engine assembly 10 of FIG. 1 or the similar engine assembly 110, it is understood that any other suitable type of engine assembly may alternately be used. For example, the compressor 22 and/or turbine section 28 may be omitted; the turbine section 28 may be present but independent from the internal combustion engine 12, i.e. the power compounding between the internal combustion engine 12 and turbine section 28 may be omitted; etc.

Moreover, it is understood that although the assemblies 50, 150 have been shown as nose assemblies, the assemblies 50, 150 may alternately be used in a wing containing a retractable landing gear and associated wheel well. Accordingly, the teachings herein are not limited to a nose assembly received at the front end of an aircraft.

In use and in accordance with a particular embodiment, the lubricant and liquid coolant of the engine assembly 10, 110 can thus be cooled by circulating a respective airflow through each cooling duct 60, 62, including circulating the airflows along opposed sides of the wheel well 54, and cooling at least the liquid coolant in one of the cooling ducts 60 with the associated cooling airflow, and at least the lubricant in the other cooling duct 62 with the associated cooling airflow. The cooling airflows are circulated through the heat exchangers 42, 46 received in the cooling ducts 60, 62, so that the engine assembly 10, 110 may be cooled with the heat exchangers 42, 46 (e.g., via the cooling fluid and/or lubricant). The cooling airflows are circulated out of the cooling ducts 60, 62 via the outlets 60o, 62o each located along a respective side of the wheel well 54.

In use and in accordance with a particular embodiment, the engine assembly 10, 110 is supported by locating the engine assembly 10, 110 above and spaced from the wheel well 54 and interconnecting the engine assembly 10 to at least one wall 54t of the wheel well 54.

The above description is meant to be exemplary only, and one skilled in the art will recognize that changes may be made to the embodiments described without departing from the scope of the invention disclosed. Modifications which fall within the scope of the present invention will be apparent to those skilled in the art, in light of a review of this disclosure, and such modifications are intended to fall within the appended claims.

The invention claimed is:

1. An assembly for an aircraft having a propeller, the assembly comprising:
    a nose nacelle;
    a wheel well integrated to said nose nacelle and configured for receiving a retracted landing gear;
    first and second cooling ducts integrated to said nose nacelle; and
    an engine assembly having an engine shaft configured for driving engagement with the propeller, the engine assembly including a coolant circulation system for circulation of a liquid coolant, a lubricant circulation system for circulation of a lubricant, a first heat exchanger in fluid communication with at least the coolant circulation system, and a second heat exchanger in fluid communication with at least the lubricant circulation system, the first heat exchanger positioned and configured for receiving a first cooling airflow from the first cooling duct, and the second heat exchanger positioned and configured for receiving a second cooling airflow from the second cooling duct, the wheel well located between the first and second heat exchangers, the first and second heat exchangers mounted in the nose nacelle on opposed sides of the wheel well.

2. The assembly as defined in claim 1, wherein the first heat exchanger is received in the first cooling duct and the second heat exchanger is received in the second cooling duct.

3. The assembly as defined in claim 1, wherein the first heat exchanger is in fluid communication with the coolant circulation system without being in fluid communication with the lubricant circulation system, and the second heat exchanger is in fluid communication with the lubricant circulation system without being in fluid communication with the coolant circulation system.

4. The assembly as defined in claim 1, wherein the first and second heat exchangers define a rearmost portion of the engine assembly.

5. The assembly as defined in claim 1, wherein the first and second cooling ducts each have a front inlet in direct fluid communication with an environment of the aircraft, the front inlet of the first and second cooling ducts configured to be located adjacent to and downstream of the propeller when the propeller is drivingly engaged to the engine assembly.

6. The assembly as defined in claim 1, wherein the engine assembly includes an intermittent internal combustion engine drivingly engaged to the engine shaft, the intermittent internal combustion engine fluidly connected to the coolant circulation system.

7. The assembly as defined in claim 6, wherein the intermittent internal combustion engine includes at least one Wankel rotary engine.

8. The assembly as defined in claim 6, wherein the engine assembly includes a compressor having an outlet in fluid communication with an intake of the intermittent internal combustion engine and a turbine having an inlet in fluid communication with an exhaust of the intermittent internal combustion engine, the turbine including a turbine shaft configured to compound power with the engine shaft.

9. The assembly as defined in claim 8, wherein an inlet of the compressor is in fluid communication with an environment of the aircraft via an inlet conduit independently of the first and second cooling ducts.

10. The assembly as defined in claim 8, wherein the first and second heat exchangers are located aft of the intermittent internal combustion engine, compressor and turbine.

11. The assembly as defined in claim 8, wherein the engine shaft is drivingly engaged to the turbine shaft via a compounding gearbox fluidly connected to the lubricant circulation system.

12. The assembly as defined in claim 1, wherein the first and second cooling ducts each includes a diffusing portion and a nozzle portion, the first and second heat exchangers located downstream of the diffusing portion and upstream of the nozzle portion of a respective one of the first and second cooling ducts, wherein along a direction of the first and second cooling airflows, the first and second cooling ducts have a progressively increasing cross-sectional area in the diffusing portion and a progressively reducing cross-sectional area in the nozzle portion.

13. An assembly for an aircraft having a propeller, the assembly comprising:
    a nose nacelle;
    a wheel well defined in the nose nacelle and configured for receiving a retracted landing gear;
    first and second cooling ducts integrated to the nose nacelle and in fluid communication with an environment of the aircraft; and
    an engine assembly received in the nose nacelle and including:
        a rotary internal combustion engine in driving engagement with an engine shaft, the engine shaft configured for driving engagement with the propeller, the rotary internal combustion engine configured for circulation of a liquid coolant therethrough,
        a turbine having an inlet in fluid communication with an exhaust of the rotary internal combustion engine, the turbine including a turbine shaft configured to compound power with the engine shaft,
        a first heat exchanger in fluid communication with the rotary internal combustion engine for circulation of the liquid coolant therethrough, the first heat exchanger positioned and configured for receiving a first cooling airflow from the first cooling duct for cooling the liquid coolant, and
        a second heat exchanger in fluid communication with a lubricant circulation system of the engine assembly, the second heat exchanger positioned and configured for receiving a second cooling airflow from the second cooling duct for cooling the lubricant, the wheel well located between the first and second heat exchangers, the first and second heat exchangers mounted in the nose nacelle on opposed sides of the wheel well.

14. The assembly as defined in claim 13, wherein the assembly is a nose assembly for a front end of the aircraft, the propeller is a nose propeller, and the landing gear is a nose landing gear.

15. The assembly as defined in claim 13, wherein the first heat exchanger is received in the first cooling duct and the second heat exchanger is received in the second cooling duct.

16. The assembly as defined in claim 13, wherein the engine assembly includes a reduction gearbox drivingly engaged to the engine shaft and configured to define the driving engagement between the engine shaft and the propeller, and wherein the first and second cooling ducts each have a front inlet in direct fluid communication with the environment of the aircraft, the reduction gearbox located adjacent to and between the front inlet of the first cooling duct and the front inlet of the second cooling duct.

17. The assembly as defined in claim 13, wherein the engine assembly includes a compressor having an outlet in fluid communication with an intake of the rotary internal combustion engine.

18. The assembly as defined in claim 17, wherein an inlet of the compressor is in fluid communication with the environment of the aircraft via an inlet conduit independently of the first and second cooling ducts.

19. The assembly as defined in claim 13, wherein the first and second heat exchangers are located aft of the rotary internal combustion engine and turbine.

20. The assembly as defined in claim 13, wherein the rotary internal combustion engine and turbine are located between the first and second cooling ducts.

21. The assembly as defined in claim 13, wherein the first and second cooling ducts each includes a diffusing portion and a nozzle portion, the first and second heat exchangers located downstream of the diffusing portion and upstream of the nozzle portion of a respective one of the first and second cooling ducts, wherein along a direction of the first and second cooling airflows, the first and second cooling ducts have a progressively increasing cross-sectional area in the diffusing portion and a progressively reducing cross-sectional area in the nozzle portion.

22. The assembly as defined in claim 13, wherein the engine shaft is drivingly engaged to the turbine shaft via a compounding gearbox fluidly connected to the lubricant circulation system.

23. A method of cooling a lubricant and a liquid coolant of an engine assembly in an aircraft having a nose propeller driven by the engine assembly received in a nose nacelle having a wheel well for receiving a retractable landing gear, the method comprising:
circulating a first airflow through a first cooling duct and a second airflow through a second cooling duct integrated to the nose nacelle, including circulating the first and second airflows through first and second heat exchangers mounted on opposed sides of the wheel well inside the nose nacelle;
with the first airflow, cooling at least the liquid coolant; and
with the second airflow, cooling at least the lubricant.

* * * * *